(12) United States Patent
Yazaki et al.

(10) Patent No.: US 7,712,974 B2
(45) Date of Patent: May 11, 2010

(54) METHOD OF ASSEMBLING AN OPTICAL CONNECTOR AND AN OPTICAL CONNECTOR

(75) Inventors: Akihiko Yazaki, Tokyo (JP); Tomoyasu Oike, Tokyo (JP); Takaya Yamauchi, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/091,629

(22) PCT Filed: Oct. 27, 2006

(86) PCT No.: PCT/US2006/042286

§ 371 (c)(1),
(2), (4) Date: Aug. 11, 2008

(87) PCT Pub. No.: WO2007/053546

PCT Pub. Date: May 10, 2007

(65) Prior Publication Data

US 2008/0310797 A1    Dec. 18, 2008

(30) Foreign Application Priority Data

Oct. 28, 2005    (JP)    ............... 2005-315041

(51) Int. Cl.
G02B 6/36     (2006.01)
G02B 6/255    (2006.01)
G02B 6/38     (2006.01)

(52) U.S. Cl. ............... 385/87; 385/55; 385/56; 385/58; 385/60; 385/62; 385/66; 385/68; 385/69; 385/75; 385/76; 385/77; 385/78; 385/81; 385/84; 385/86; 385/95; 385/97; 385/98; 385/99

(58) Field of Classification Search ............... 385/81, 385/84, 86, 87, 98, 99
See application file for complete search history.

(56) References Cited

U.S. PATENT DOCUMENTS 5,040,867 A    8/1991    de Jong et al.

(Continued)

FOREIGN PATENT DOCUMENTS

JP    UM 3022015    12/1995

(Continued)

*Primary Examiner*—Ryan Lepisto
(74) *Attorney, Agent, or Firm*—Gregg H. Rosenblatt

(57) ABSTRACT

An optical connector and a method of assembling an optical connector that is capable of avoiding generation of unnecessary tension in the optical fiber cable in which plain fiber portions are optically connected to each other using a splice assembly. The optical connector comprises a connector housing having splice means configured to abut a stripped and cleaved end surface of a plain fiber of an optical fiber cable (2) onto an end of a fiber stub predisposed in the splice means to form an optical connection; and a cable fixing assembly (26, 40), that includes a cable fixing member (26) and a cable holder (40), for fixing an outer covering (2c) of the optical fiber cable (2) introduced into said connector housing (10). The cable fixing member (26), which includes an opposing piece (26b) for slidably engaging with a guide section (24) formed on the wall of an end cap (21) of the connector housing (10), is pressed in from the direction perpendicular to the axis of the optical fiber cable (2) and is mounted on the wall of the end cap (21). A step section is formed on the sliding surface of the opposing piece (26b) to be in sliding contact with the sliding surface of the guide section (24), for moving the cable fixing member (26) together with the optical fiber cable (2) so as to reduce a distance between the splice means (3) and the cable holder (40).

2 Claims, 6 Drawing Sheets

U.S. PATENT DOCUMENTS

| | | |
|---|---|---|
| 5,189,717 A | 2/1993 | Larson et al. |
| 5,732,174 A | 3/1998 | Carpenter et al. |
| 5,761,360 A | 6/1998 | Grois et al. |
| 5,812,718 A | 9/1998 | Carpenter et al. |
| 5,993,070 A | 11/1999 | Tamekuni et al. |
| 6,816,661 B1 | 11/2004 | Barnes et al. |
| 6,848,838 B2 | 2/2005 | Doss et al. |
| 6,870,996 B2 | 3/2005 | Doss et al. |
| 6,913,394 B2 * | 7/2005 | Iwano et al. .................. 385/78 |
| 7,011,454 B2 * | 3/2006 | Caveney et al. ............... 385/87 |
| 7,140,787 B2 | 11/2006 | Yamauchi et al. |
| 7,178,990 B2 | 2/2007 | Caveney et al. |
| 7,220,061 B2 * | 5/2007 | De Marchi .................. 385/76 |
| 7,270,487 B2 | 9/2007 | Billman et al. |
| 7,280,733 B2 | 10/2007 | Larson et al. |
| 7,331,718 B2 | 2/2008 | Yazaki et al. |
| 7,369,738 B2 | 5/2008 | Larson et al. |
| 7,454,117 B2 | 11/2008 | Carpenter et al. |
| 2005/0063662 A1 | 3/2005 | Carpenter et al. |
| 2005/0238292 A1 | 10/2005 | Barnes et al. |
| 2007/0133926 A1 | 6/2007 | Semmler et al. |
| 2007/0147741 A1 | 6/2007 | Meek et al. |
| 2007/0172179 A1 | 7/2007 | Billman et al. |

FOREIGN PATENT DOCUMENTS

| | | |
|---|---|---|
| JP | 11-064683 | 3/1999 |
| JP | 3445479 B2 | 6/2003 |
| JP | 2005-140989 A | 6/2005 |
| WO | WO 2006/019515 A1 | 2/2006 |
| WO | WO 2006/019516 A1 | 2/2006 |
| WO | WO 2007/053496 A1 | 5/2007 |

* cited by examiner

METHOD OF ASSEMBLING AN OPTICAL CONNECTOR AND AN OPTICAL CONNECTOR

CROSS REFERENCE TO RELATED APPLICATIONS

This application is a national stage filing under 35 U.S.C. 371 of PCT/US2006/042286, filed Oct. 27, 2006, which claims priority to Japanese Application No. 2005-315041, filed Oct. 28, 2005, the disclosure of which is incorporated by reference in its entirety herein.

FIELD OF THE INVENTION

The present invention relates to a method of assembling an optical connector and an optical connector itself comprising a connector housing having a splice assembly incorporated therein for abutting an end surface of a plain fiber portion of an optical fiber cable with a covering removed therefrom onto an end surface of a counterpart plain fiber portion provided beforehand in the splice assembly to form an optical connection.

DESCRIPTION OF RELATED ART

In general, an optical connector having a splice assembly incorporated therein for abutting an end surface of a plain fiber portion of optical fiber cable with a covering removed therefrom onto an end surface of a counterpart plain fiber portion provided beforehand in the splice assembly to form an optical connection is used on site for quick and easy interconnection of optical fiber cables with each other, and is known from Japanese Patent No. 3445479, for example.

In Japanese Patent No. 3445479, a so-called mechanical splice SC-type optical connector is disclosed which comprises a splice assembly holding a ferrule incorporating a plain fiber portion and the exposed portion of the plain fiber portion projecting from the rear end surface of the ferrule, wherein the exposed portion of the plain fiber portion and another plain fiber portion of an optical fiber cable is introduced from the other end of the splice assembly are abutted onto the end surface of each other to form an optical connection.

In another example of prior art, an two-core type optical connector is disclosed which comprises a cable fixing member for preventing an optical fiber cable from being broken or damaged in the event of excessive tension being inadvertently applied to the optical fiber cable (for example, Japanese Utility Model Registration No. 3022015).

The optical connector described in Japanese Utility Model Registration No. 3022015 comprises a cable fixing member having a U-shaped groove disposed in the cable passage provided in the connector housing. Connection of an optical fiber cable is performed by placing the cable fixing member in a position on the connector housing so as to open the fiber passage, and after inserting the front end portion of the optical fiber cable into the fiber passage, pressing the cable fixing member into the fiber passage and pressing the covering of the optical fiber cable into the U-shaped groove.

SUMMARY

Problem to be Solved by the Invention

In an optical connector (for example SC-type optical connector) having a mechanical splice assembly incorporated therein, the plain fiber portion of the optical fiber cable which is fixed only by means of the splice assembly may be broken when the optical fiber cable is subjected to tension in the direction opposite to the connector-fitting (toward the rear portion of the connector housing). In order to prevent the plain fiber portion from being broken, a cable fixing member as described in Japanese Utility Model Registration No. 3022015 may be used to fix the covering of the optical fiber cable to the connector housing. In this case, however, it is possible that the optical fiber cable is fixed under tension of the primary coating portion $51b$ (see FIG. 9) and it may be broken by an inadvertent tension. FIG. 9 is a cross-sectional view showing an optical connector 50 in which the covering $51a$ of the optical fiber cable 51 is fixed to the connector housing 53 by means of a cable fixing member 52, wherein (a) shows a state of the primary coating portion $51b$ under tension before being broken, and (b) shows a state of the primary coating portion $51b$ broken due to tension generated in the direction F of the connector-fitting or in the direction B opposite to the connector-fitting.

Some optical connectors are constructed such that an optical fiber cable is fixed to the connector housing with the cable deformed in flexure (with excessive length) so as not to be subjected to tension. With these optical connectors, however, there is variation in the length of the primary coating portion terminated, so that, in some cases, the cable is bent more than is necessary and leads to bending loss, and in others, the flexure is too small to be effective. Thus, the quality of the optical connection characteristics is not consistent and varies in individual optical connectors.

In an optical connector having no spring provided in the rear of the connector housing, the splice assembly is adapted to be able to move back and forth such that ferrules of fitting connectors are automatically centered in position, and there has been a problem that, depending on relative position of the splice assembly and the connector housing, upon disconnection of the counterpart connector, the optical fiber cable may be pulled in the direction of connector-fitting (toward the front portion of the connector housing) and the primary coating portion in the connector housing may be subjected to tension.

Therefore, it is an object of the present invention to provide a method of assembling an optical connector and an optical connector assembled by same method that is capable of avoiding generation of unnecessary tension in the optical fiber cable optically connected to each other by means of the splice assembly and thereby preventing the primary coating portion from being broken, and is thus excellent in reliability of optical connection.

Means for Solving the Problem

In order to solve above problems, in accordance with the invention as described herein, there is provided a method of assembling an optical connector, comprising the steps of: inserting an optical fiber cable hold in a cable holder from one end of a connector housing which has a splice means incorporated therein; abutting an end surface of a plain fiber of said first optical fiber cable with the covering removed therefrom onto an end surface of a counterpart plain fiber portion provided beforehand in the splice means so as to form an optical connection; and fixing an outer covering of the fiber cable to said connector housing while moving said optical fiber cable toward said splice means so as to reduce a distance between the splice means and the cable holder, thus reducing tension on the plain fiber.

In accordance with the invention as described herein, there is provided an optical connector comprising: a connector housing having a splice assembly configured to abut a stripped and cleaved end surface of a plain fiber of an optical fiber cable onto an end of a fiber stub predisposed in the splice assembly to form an optical connection; and a cable fixing assembly, that includes a cable fixing member and a cable holder, for fixing an outer covering of the optical fiber cable introduced into the connector housing; wherein the cable fixing member, which includes an opposing piece for slidably engaging with a guide section formed on the wall of an end cap of the connector housing, is pressed in from the direction perpendicular to the axis of the optical fiber cable and is mounted on the wall of the end cap, and wherein a step section is formed on the sliding surface of the opposing piece to be in sliding contact with the sliding surface of the guide section, for moving the cable fixing member together with the optical fiber cable so as to reduce a distance between the splice assembly and the cable holder.

In accordance with the invention described herein, there is provided an optical connector as claimed in claim 2, wherein the wherein said guide section comprises a groove.

In accordance with the invention as described herein, there is provided an optical connector, wherein a flexible biasing piece is provided on the connector housing for biasing the splice assembly in the direction for fitting the connector.

In accordance with the invention described herein, there is provided an optical connector, wherein the biasing force of the flexible biasing piece is set to be weaker than the biasing force of a spring provided in the counterpart connector to be mutually fitted to each other for biasing the ferrule of the counterpart connector in the direction for connector-fitting.

In accordance with the invention as described herein, there is provided an optical connector, wherein the optical connector comprises SC-type connector.

Effect of the Invention

According to the invention as described herein, the outer covering is fixed to the connector housing while the outer covering is moved toward the splice assembly, so that the optical fiber cable can be fixed without generating tension in the primary coating portion of the optical fiber cable and the primary coating portion of the optical fiber cable can be prevented from being broken or damaged.

According to the invention as described herein, when the end portion of the outer covering of the optical fiber cable is fixed to the wall of the connector housing with the cable fixing assembly, the cable fixing member together with the optical fiber cable is moved toward the splice assembly by means of a step section formed on the sliding surfaces of the opposing piece, so as to reduce a distance between the splice means and the cable holder, whereby form an excess length of the primary coating portion. Therefore, the optical fiber cable can be fixed without generating tension in the primary coating portion of the optical fiber cable, and consequently, the primary coating portion of the optical fiber cable can be prevented from being broken or damaged.

According to the invention as described herein, the guide section comprises a groove, so that the opposing piece of the cable fixing member can be guided and smoothly inserted in sliding motion.

According to the invention as described herein, a flexible biasing piece is provided in the connector housing for biasing biasing the splice assembly in the direction of the connector-fitting, so that plain fibers can be optically connected with the splice assembly, which would be in a floating state in an optical connector having no biasing spring, being abutted to the wall in the front portion of the connector housing. Therefore, the primary coating portion can be prevented from being broken upon disconnection of the fitted connectors.

According to the invention as described herein, the biasing force of the flexible biasing piece is weaker than the biasing force of a spring provided in the counterpart connector to be mutually fitted to each other, so that, upon fitting of connectors, the splice assembly can be moved in the direction opposite to the connector fitting, and therefore, ferrules can be adjusted in centering position and the end surfaces of plain fibers can be brought into contact with each other without offset of axes.

According to the invention as described herein, the above mentioned problems can be solved by general-purpose connector. In particular, when the connector was assembled, the problems of unnecessary tension in the primary coating portion can be avoided.

DETAILED DESCRIPTION

Figure 1:
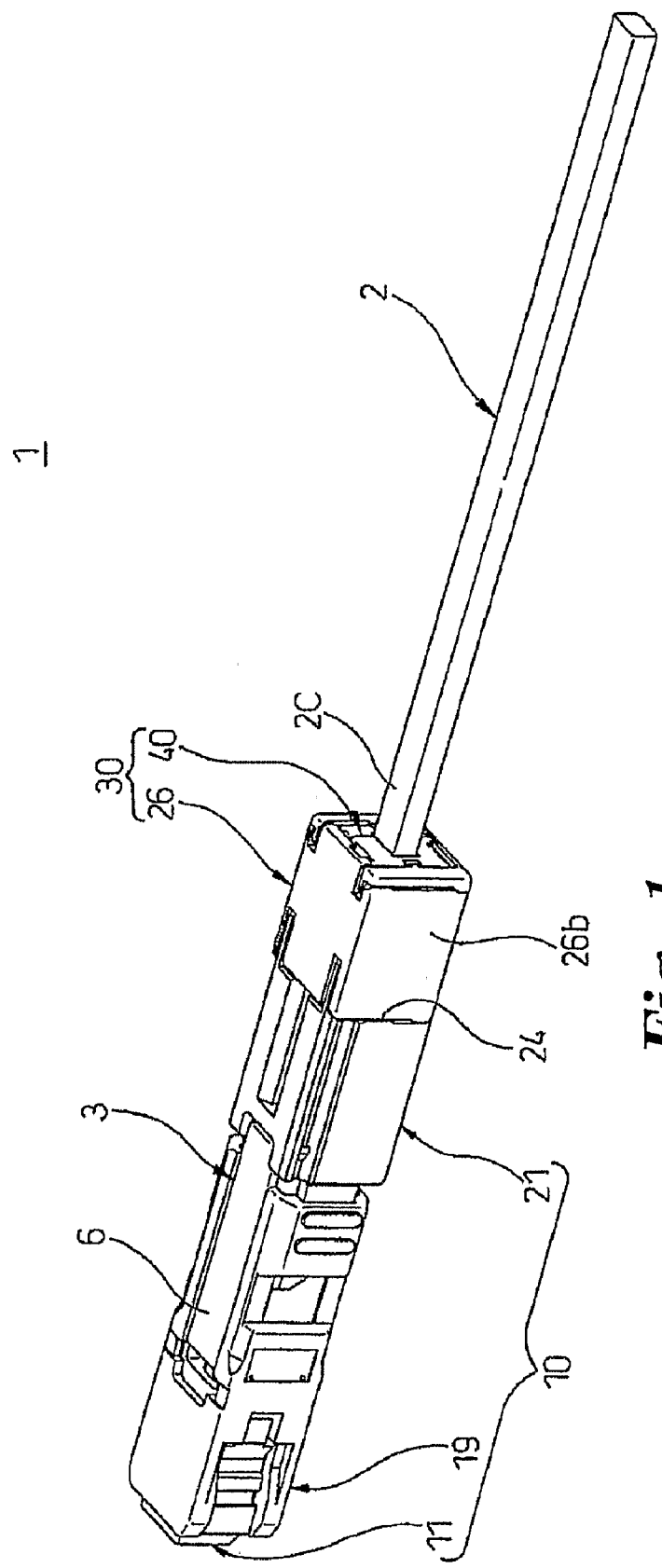
FIG. 1 is a perspective view showing an optical connector according to an embodiment of the present invention.
Figure 2:
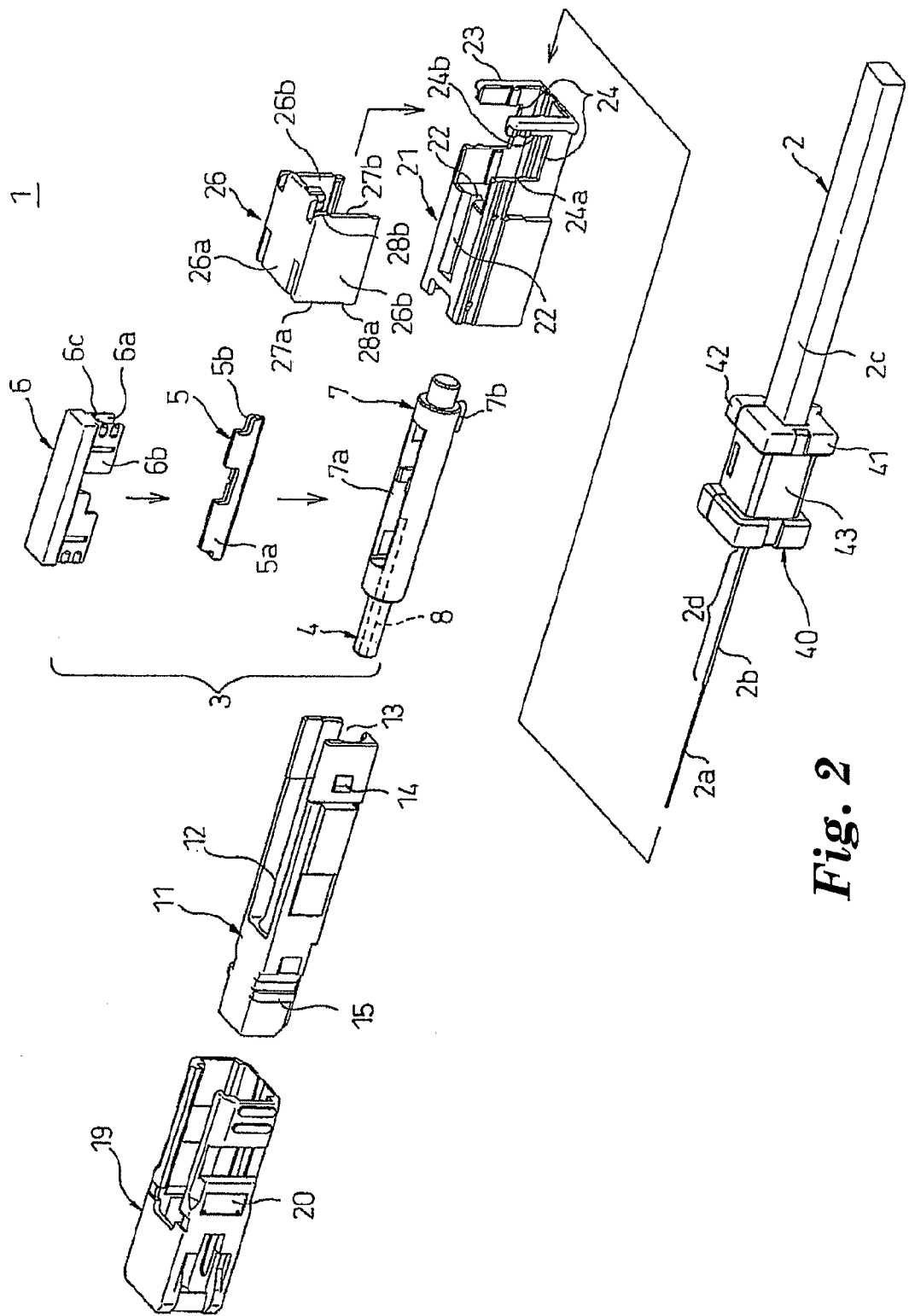
FIG. 2 is an exploded perspective view showing the optical connector of FIG. 1.

Now, the present invention will be described in detail below with reference to drawings showing embodiments thereof. FIG. 1 and FIG. 2 are views showing an optical connector according to an embodiment of the present invention. FIG. 1 is a perspective view and FIG. 2 is an exploded perspective view. An optical connector 1 according to this embodiment comprises an optical fiber cable 2 having a plain fiber portion 2a surrounded by an outer covering 2c, a splice assembly 3 in which an end surfaces of the plain fiber portions 2a are abutted to each other to form an optical connection, a housing main body 11 having the splice means 3 incorporated therein, an end cap 21 mounted in the rear of the housing main body 11 for receiving the outer covering 2c of the optical fiber cable 2 held by a cable holder 40, a cable fixing assembly 30 for fixing the outer covering 2c of the optical fiber cable 2 to the end cap 21, and a shell 19 for fitting to a connector housing of a counterpart connector (not shown). A connector housing 10 is composed of the housing main body 11, the end cap 21 and the shell 19.

The optical fiber cable 2 of the optical connector 1 comprises a glass optical fiber (plain fiber portion) 2a, an inner coating (primary coating) 2b as a primary sheath for covering the glass optical fiber 2a and an outer covering 2c as a secondary sheath, and a high tensile strength member for protecting the glass optical fiber 2a as required. The glass optical fiber 2a has a circular cross-sectional shape with a transparent core in the center for transmitting light signal and a transparent clad of smaller refractive index than that of the core arranged at the outside of the core.

The primary sheath 2b is formed of, for example, acryl resin as UV material, and the secondary sheath 2c is formed of, for example, polyethylene resin. The primary sheath 2b and the secondary sheath 2c are subjected to termination processing of being successively stripped off from the end portion of the cable so as to expose a predetermined length of the glass optical fiber 2a. Processing of the terminating end of the fiber is accomplished by using a termination processing tool (not shown) with the end portion of the optical fiber cable held in the cable holder 40.

The cable fixing assembly comprises a clip (cable fixing member) 26, and a cable holder 40 for fixing the outer covering 2c of the optical fiber cable 2 introduced into the connector housing 10.

The cable holder 40 has a pair of walls 41, 42 integrally molded in one unit of resin material so as to be opened or closed via a hinge section. Saw-tooth shaped protrusions are formed on the inner surface of the pair of walls 41, 42, and when the pair of walls 41, 42 are closed with the outer covering 2c of the optical fiber cable 2 placed between the pair of walls 41, 42, the protrusions are pressed into the outer covering 2c so as to fix the optical fiber cable 2 to the cable holder 40.

Outer wall of the cable holder 40 expands on both ends and is narrower in the center portion. The narrower portion 43 is sandwiched by the clip 26 to be described later, and is adapted to move in the direction of connector-fitting when the clip 26 is attached to the end cap 21.

The glass optical fiber 2a is defined herein as a plain fiber portion, and the glass optical fiber covered with the primary sheath is defined as a primary coating portion 2d, and the glass optical fiber covered with the primary sheath 2b and the secondary sheath 2c is defined as an optical fiber cable 2 in this specification.

The splice assembly 3 in the optical connector 1 comprise a ferrule 4 for holding the plain fiber portion 2a in the state of being released from one end of the ferrule 4, an element 5 that is a plain fiber fixing member capable of being opened and closed for interconnecting a fiber stub (counterpart plain fiber portion) 8 released from one end of the ferrule 4 with the plain fiber portion 2a of an optical fiber cable 2, a cap member 6 for causing a pair of folded pieces 5a, 5b of an opened element 5 to be brought into a closed state to fix the plain fibers 2a, 8 to each other between the pair of folded pieces 5a, 5b, and a base member 7 for holding the ferrule 4 and the element 5.

The ferrule 4 of the splice assembly 3 is a tubular member formed of resin or ceramic material having a through-hole for passing a plain fiber portion 2a through it along the center axis, and its outer circumferential surface is defined as the centering surface to be positioned coaxially with the counterpart ferrule with no offset of axis. The end surface of the ferrule to be abutted to the end surface of the counterpart ferrule is formed as a flat surface perpendicular to the center axis.

In the through-hole that is formed to penetrate from one end to the other end of the ferrule, a predetermined length of a portion of the plain fiber to be connected is inserted and fixed with an adhesive. The plain fiber to be connected is disposed with the center axis coinciding with the center axis of the ferrule 4.

In general, the fiber stub 8 to be connected is, after being inserted into the through-hole of the ferrule and fixed, made to be flush with the ferrule end surface by polishing the end surface of the ferrule to mirror surface. The fiber stub 8 released from one end of the ferrule 4 is cut at an arbitrary position with a cutting tool. The cut surface is formed into a flat surface perpendicular to the center axis of the ferrule 4.

The ferrule 4 is fixed integrally as one unit to the base member 7 with one end from which the fiber stub 8 is released being pressed into a hole (not shown) that is formed at one end of the base member 7, and with the other end of the ferrule 4 projecting from the base member 7. On the other end of the ferrule, a split sleeve (not shown) is mounted so as to achieve accurate positioning with the ferrule of the counterpart connector.

The element 5 of the splice assembly 3 is formed by punching a thin plate material such as aluminum with a press and then folding the punched plate in two along the center axis. Thus, the element 5 has a pair of folded pieces 5a, 5b disposed in opposition to each other. In one of the folded pieces 5a, 5b, an unshown straight groove is formed to be disposed coaxially with the center axis of the ferrule 4. The pair of folded pieces 5a, 5b is formed so as to be capable of being opened or closed with the folding line as the center. By folding the pair of folding piece 5a, 5b against the elastic restoring force in closing direction with plain fibers 2a having end surfaces abutted to each other placed in the groove, the plain fibers 2a are sandwiched and fixed between the pair of folding pieces 5a, 5b.

The cap member 6 of the splice assembly 3 is formed of, for example, resin material, and has a pair of holding walls 6b, 6c which define the recess capable of receiving a pair of folding pieces 5a, 5b of the element 5. The pair of holding walls 6b, 6c are disposed at a specified separation generally in parallel and opposed to each other. On the inner surface 6a of the holding walls 6b, 6c, an unshown step section is formed such that the separation of the opposing walls becomes narrower at greater depth, whereby a force is exerted to the pair of folding pieces 5a, 5b of the element 5 in closing direction and opposing surfaces of the pair of folding pieces 5a, 5b are pressed so as to be in close contact with each other. Thus, the closed state of the element 5 is maintained as long as the cap member 6 is not removed from the element 5.

The base member 7 of the splice assembly 3 has a hole formed at the front end for the ferrule 4 to be pressed therein, has a guide hole formed at the rear end for guiding insertion of the plain fiber portion 2a of the optical fiber cable 2, and has an opening 7a formed on outer circumferential surface for receiving the element 5 and the cap member 6. The guide hole is formed in tapered shape so that the plain fiber portion 2a can be smoothly guided and inserted without being caught.

The housing main body 11 of the optical connector 1 is formed by resin molding, with a receiving section 12 formed therein for receiving the splice assembly. The front half of the receiving section 12 is covered by a tubular wall, while an opening is formed on the upper wall of rear half of the receiving section. In the center of the tubular wall, the ferrule is disposed at the center in a floating state. In the rear half, a guide groove 13 is formed on the bottom wall opposed to the upper wall to be slidably engaged with the projecting piece 7b of the base member 7.

Also, in the rear half, on a pair of side wall outer surfaces, an engaging claw 14 is projectingly provided for engaging with an unshown engaging section formed on the side wall inner surface of the end cap 21. By engagement of the engaging section with the engaging claw 14, the housing main body 11 is integrated to the end cap 21 in one unit.

On the outer surface of the side wall of the front half, an engaging claw 15 is projectingly provided for engaging with an engaging section 20 on the shell 19 which constitutes the outer wall of the female type optical connector 1. By engagement of the engaging section 20 with the engaging claw 15, the housing main body 11 is integrated to the shell 19 in one unit.

The shell 19 of the optical connector 1 is formed in a shape adapted to fit to not shown coupling (adaptor). Therefore, the counterpart connector is connected the optical connector 1 via the coupling.

The end cap 21 of the optical connector 1 comprises a front portion having a slit 22 for inserting and passing the primary coating portion 2*d* on the side of the housing main body 11 and a rear portion having a holder receiving section 23 for receiving the cable holder 40 fixed to the optical fiber cable 2. On the inner surface of the side wall of the front portion, an unshown engaging section is formed to be engaged with the engaging claw 14 of the housing main body 11. On a pair of side walls of the rear portion, a guide section 24 is formed for mounting the clip 26. As will be described in detail later, when the clip 26 is mounted to the guide section 24, the clip 26 is slightly moved in the direction of connector-fitting (toward the splice assembly) due to step sections 28*a*, 28*b* formed on the sliding contact surface 27*a*, 27*b* of the clip 26.

Figure 3:
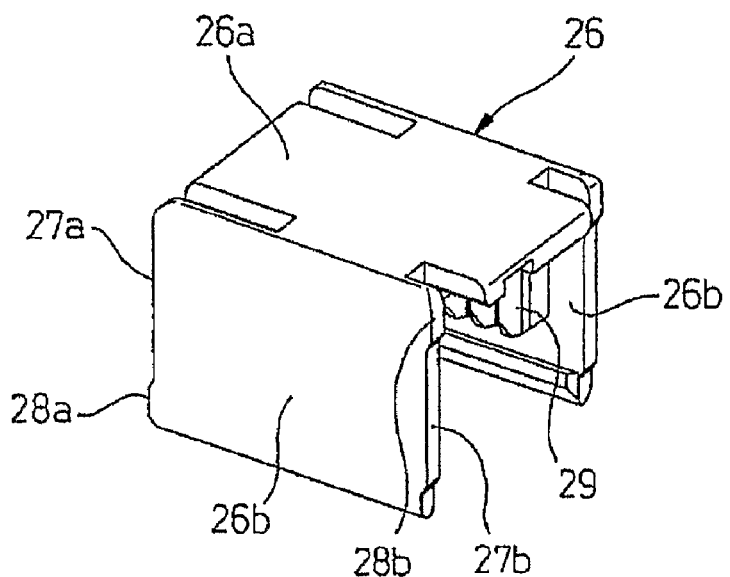
FIG. 3 is a perspective view showing a clip (cable fixing member) of the optical connector of FIG. 1.
Figure 4:
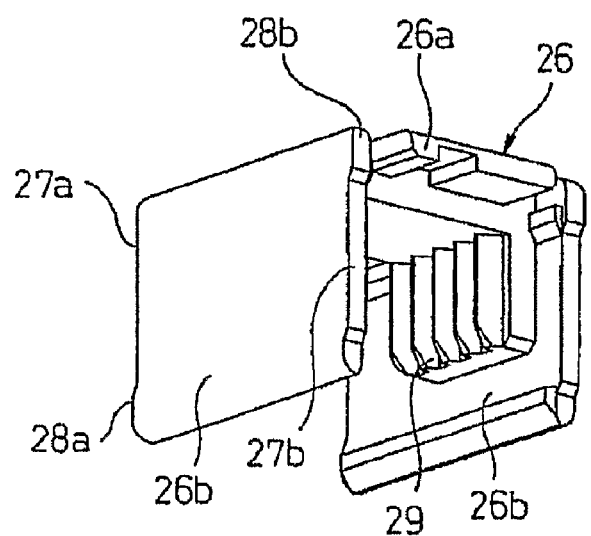
FIG. 4 is a perspective view showing the clip of the same optical connector as seen from different direction.

As shown in FIGS. 3 and 4, the clip 26 of the optical connector 1 is a resin molding of with a pair of opposing walls (opposing pieces) 26*b*, 26*b* on both sides of the upper wall 26*a*. On the inner surface of the pair of opposing walls 26*b*, 26*b*, a pair of holding walls (holding sections) 29, 29 are provided for holding the cable holder by pressing saw-tooth shaped protrusions into the wall of the cable holder. For this purpose, the opposing separation of the pair of holding walls 29, 29 is narrower than the opposing separation of the pair of opposing walls 26*b*, 26*b*. The pair of opposing walls 26*b*, 26*b* are formed in such dimension and shape that it can slide in contact with the guide section (groove) 24 of the end cap 21. The front and rear end surfaces of the opposing walls 26*b*, 26*b* are formed as sliding surfaces 27*a*, 27*b* of narrow width, respectively. Step sections 28*a*, 28*b* are formed in staggered positions on the sliding surfaces 27*a*, 27*b* of the individual opposing walls 26*b*, 26*b*. Step sections 28*b* are projectingly provided at the base side positions on the rear sliding surface 27*b*, and step sections 28*a* are projectingly provided at front side positions on the front sliding surface 27*a*.

By forming the step sections 28*a*, 28*b* in this manner, when the clip 26 is mounted to the guide section 24 of the end cap 21 from the direction perpendicular to the axis of the optical fiber cable 2, the clip 26 with the cable holder 40 sandwiched therebetween, is moved in the direction of the connector-fitting (the clip 26 is moved toward the splice assembly), so as to reduce a distance between the splice assembly 3 and the cable holder 40, and form an excess length of the primary coating portion 2*d*.

Figure 5:
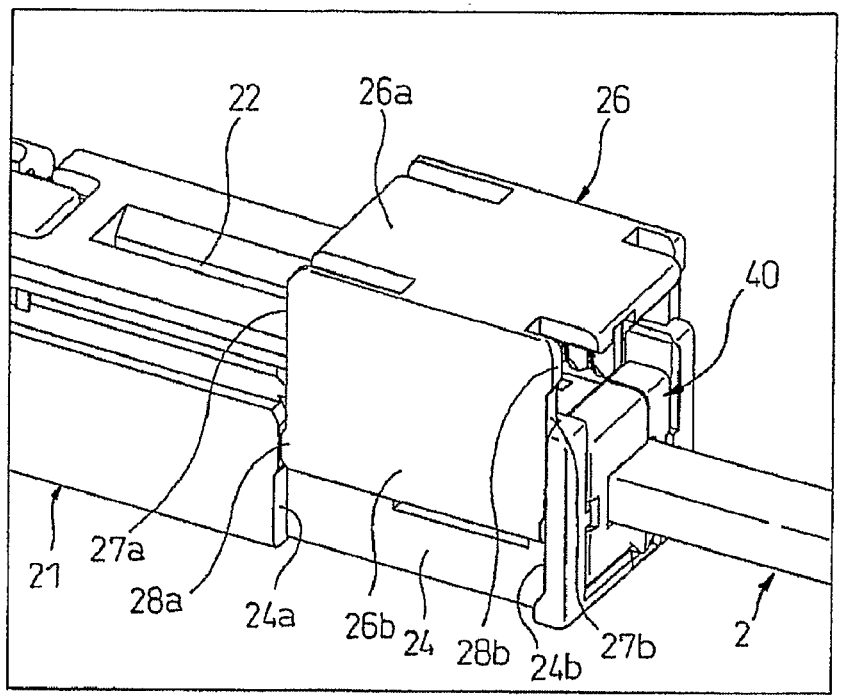
FIG. 5 is a perspective view showing the clip of the same optical connector being mounted to an end cap.
Figure 6:
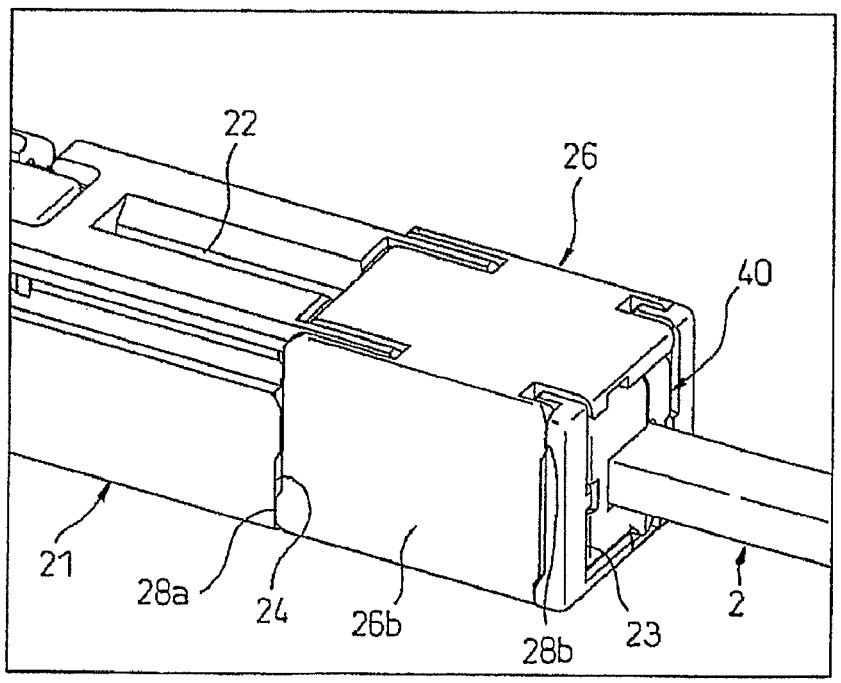
FIG. 6 is a perspective view showing the clip of the same optical connector mounted to the end cap.

FIGS. 5 and 6 are views useful for explaining the action of the clip 26. The clip 26 is mounted after the end surfaces of the plain fiber portions 2*a*, 8 are brought into contact with each other with pressure applied to the plain fiber portion 2*a* of the optical fiber cable 2 to form an optical connection and looseness of the primary coating portion 2*d* is released in the end cap 21. As shown in FIG. 5, the clip 26 is positioned to the opening end of the guide section 24 of the end cap 21 and then pressed downward. When the tip of the opposing walls 26*b*, 26*b* of the clip 26 is pressed into the guide section 24, the front step 28*a* is abutted to the front sliding surface 24*a* of the guide section 24 so that the rear side sliding surface 27*b* is abutted strongly to the rear sliding surface 24*b* of the guide section 24. By further pressing and sliding the clip 26, the cable holder 40 is held between the pair of holding walls 29. When the clip 26 is further depressed, as shown in FIG. 6, the base side step 28*b* on the rear sliding surface 27*b* of the opposing walls 26*b*, 26*b* is abutted to the sliding surface 24*b* of the guide section 24. As a result, the clip 26 is subjected to reaction from the rear sliding surface 24*b* of the guide section 24, and the clip 26 together with the cable holder 40 is thereby moved by a distance corresponding to the height of the step 28*b* in the direction for connector-fitting, and in this state, the clip 26 is mounted to the end cap 21. Therefore, a distance between the splice assembly 3 and the cable holder 40 is reduced, and the excess length of the primary coating portion 2*d* is formed, so that retreat of the cable holder 40 due to mounting of the clip 26 can be avoided and generation of tension in the primary coating portion 2*d* can be prevented.

Figure 7:
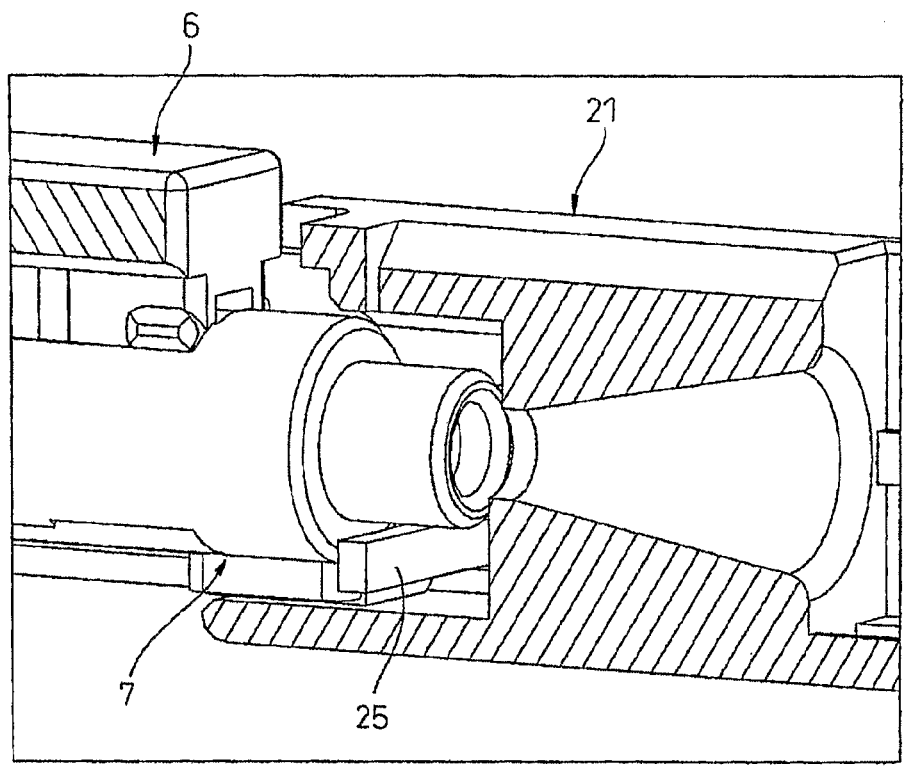
FIG. 7 is a cross-sectional view showing a flexible biasing piece of the same optical connector for biasing the splice assembly in the direction for connector-fitting, as seen from an oblique direction.
Figure 8:
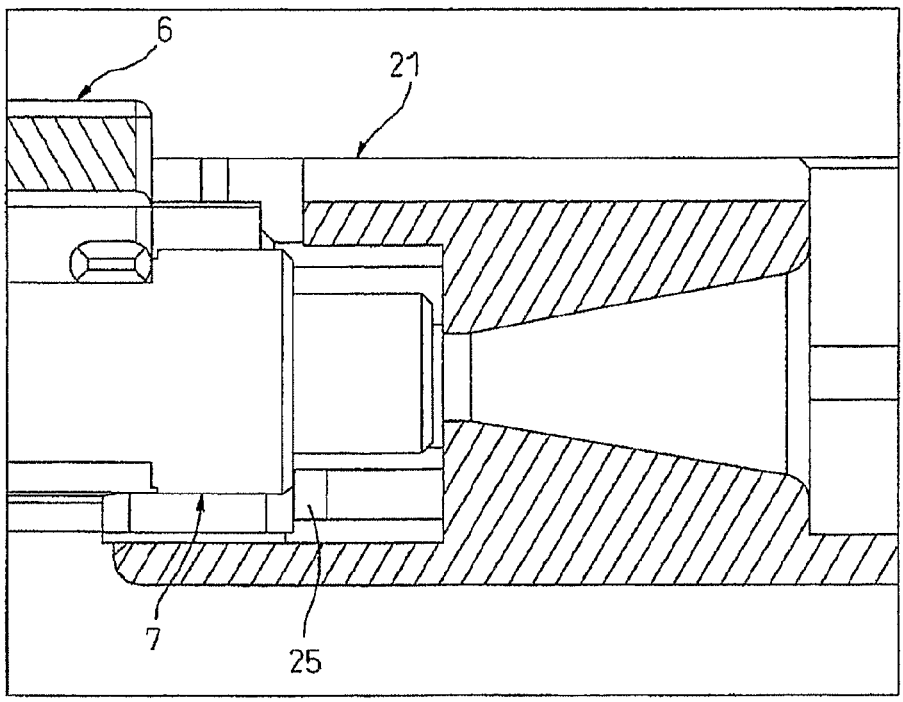
FIG. 8 is a cross-sectional view showing the flexible biasing piece of the same optical connector for biasing the splice assembly in the direction for connector-fitting, as seen from another oblique direction.
Figure 9A:
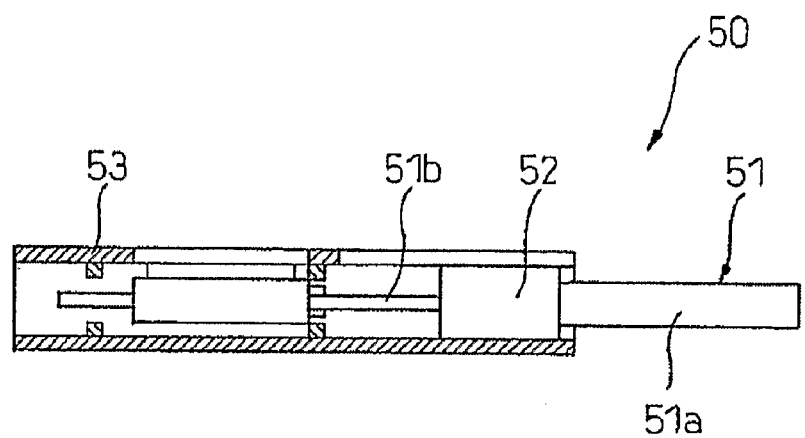
FIG. 9 is a cross-sectional view showing an example of conventional optical connector.
Figure 9B:
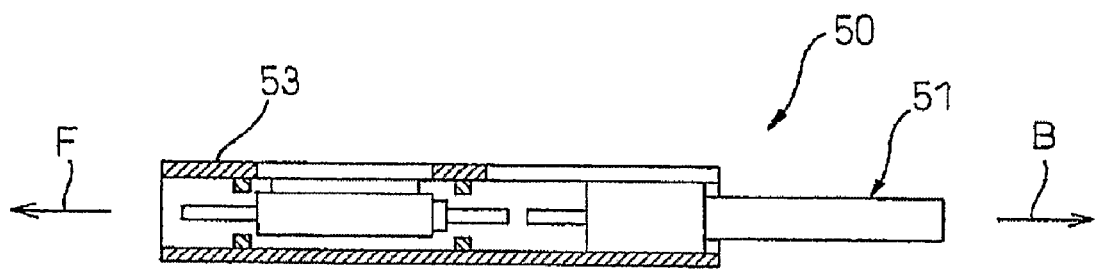

Next, referring to FIGS. 7 and 8, the construction in which generation of tension in the primary coating portion 2*d* can be prevented by the movement of the splice assembly 3 in the direction for connector-fitting, will be explained. This construction is applied to a connector having no spring for biasing the splice assembly 3 with a ferrule 4 in the direction of connector-fitting. A flexible biasing piece 25 that can be bent back and forth is provided on the wall of the end cap 21. When the end cap 21 is mounted to the housing main body 11, the flexible biasing piece 25 is abutted to the rear end surface of the base member 7 of the splice assembly 3, biasing the base member 7 with its elastic restoring force in the direction for connector-fitting to thereby absorb the play between the front end surface of the base member 7 and the housing main body 11. Thus, the primary coating portion 2*d* can be prevented from being broken upon disconnection of the fitted connectors.

The biasing force of the flexible biasing piece 25 is set to be weaker than the spring force of a spring incorporated in the counterpart connector to be mutually fitted for biasing the ferrule of the counterpart connector in the direction of connector-fitting, so that, upon fitting of connectors, the spring force overcomes the biasing force of the flexible biasing piece 25 and can move the base member 7 (splice assembly 3) in the direction opposite to the connector-fitting. The ferrules are thereby properly centered, and the end surfaces of the fibers can be brought into contact with each other with no offset of axes.

The present invention is not limited to the embodiment as described above, and can be carried out in other forms. For example, although, in the optical connector 1 of the present embodiment, the end portion of the outer covering 2*c* of the optical fiber cable 2 is fixed to the wall of the end cap 21 with the clip 26 via the cable holder 40, the end portion of the outer covering 2*c* can be fixed directly with the clip 26. Also, in place of the plastic clip 26 used in the present embodiment, a metal clip may be used.

Description of Symbols

1—optical connector
2—optical fiber cable
3—splice assembly (splice means)
10—connector housing
11—housing main body
21—end cap
24—guide section
25—flexible biasing piece 26—clip (cable fixing member)
26b—opposing piece
28a, 28b—step section
30—cable fixing assembly
40—cable holder

The invention claimed is:

1. A method of assembling an optical connector, comprising the steps of:

inserting an optical fiber cable held in a cable holder from one end of a connector housing which has a splice means incorporated therein;

abutting an end surface of a plain fiber of said optical fiber cable with the covering removed therefrom onto an end surface of a counterpart plain fiber portion provided beforehand in the splice means so as to form an optical connection; and fixing an outer covering of the fiber cable to said connector housing while moving said optical fiber cable toward said splice means so as to reduce a distance between the splice means and the cable holder, thus reducing tension on the plain fiber.

2. The method of claim 1, wherein said fixing step comprises fixing an outer covering of the fiber cable to said connector housing while moving said optical fiber cable toward said splice means so as to reduce a distance between the splice means and the cable holder by a predetermined distance, thus reducing tension on the plain fiber.

* * * * *